(No Model.) 2 Sheets—Sheet 1.
S. BISSELL.
GLASS FURNACE.
No. 578,441. Patented Mar. 9, 1897.
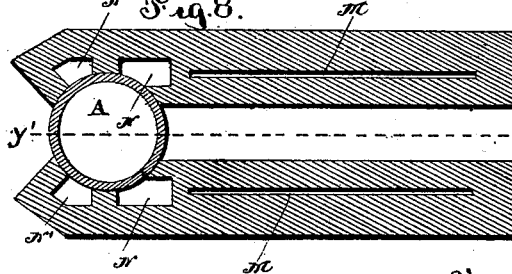
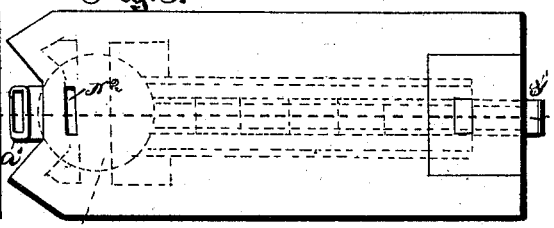
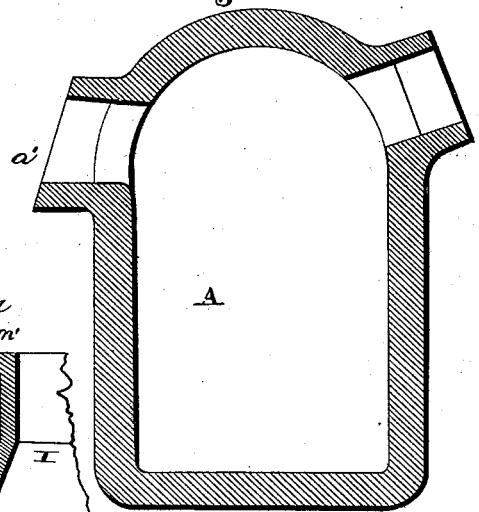
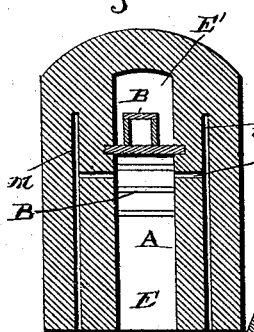
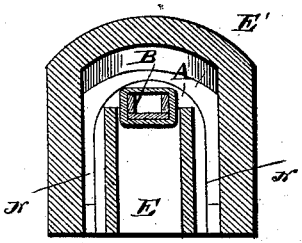
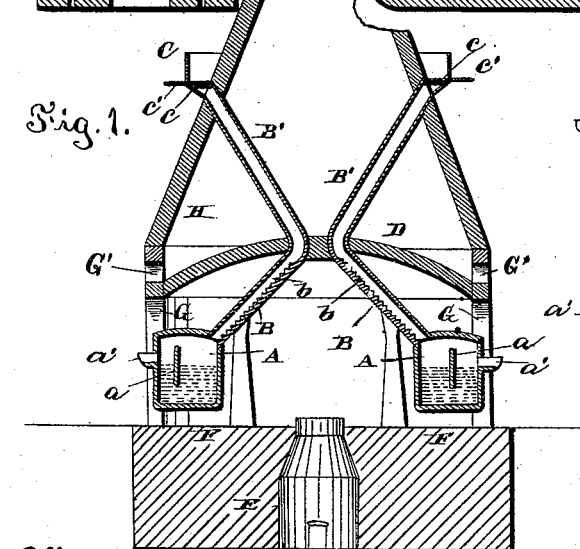
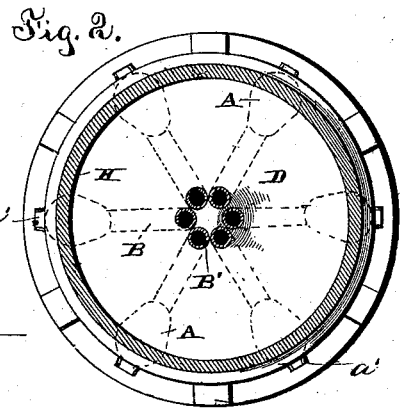
Witnesses
John Imirie
M. B. May
Inventor
Simeon Bissell
By his Attorneys
Doubleday & Bliss (No Model.) 2 Sheets—Sheet 2.
S. BISSELL.
GLASS FURNACE.
No. 578,441. Patented Mar. 9, 1897.
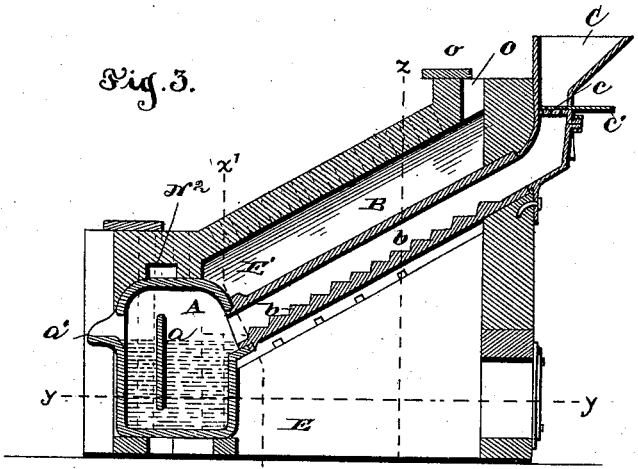
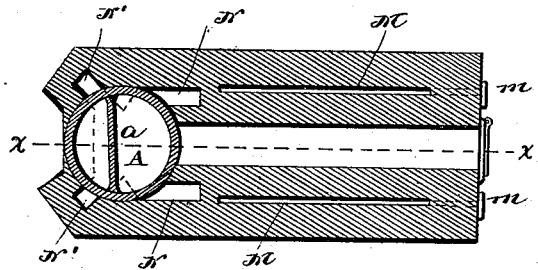
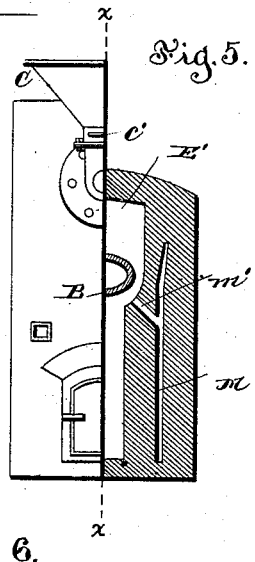
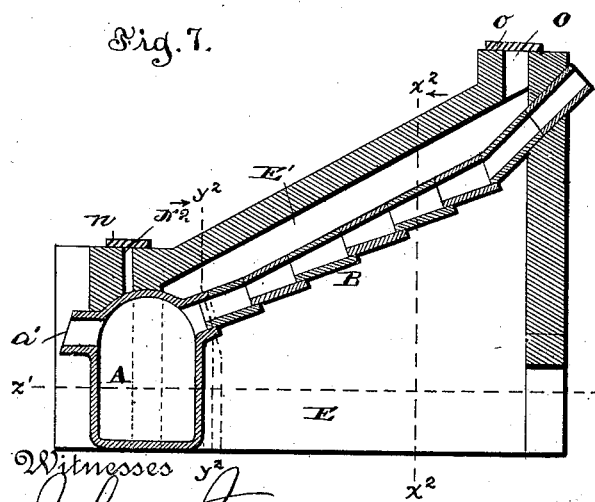
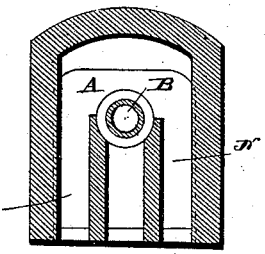
Witnesses
John Imurie
M. B. May
Inventor
Simeon Bissell
By his Attorneys
Doubleday & Bliss

UNITED STATES PATENT OFFICE.

SIMEON BISSELL, OF PITTSBURG, PENNSYLVANIA, ASSIGNOR TO HENRY H. BLISS, OF WASHINGTON, DISTRICT OF COLUMBIA.

GLASS-FURNACE.

SPECIFICATION forming part of Letters Patent No. 578,441, dated March 9, 1897.

Application filed July 11, 1890. Serial No. 558,419. (No model.)

*To all whom it may concern:*

Be it known that I, SIMEON BISSELL, a citizen of the United States, residing at Pittsburg, in the county of Allegheny and State of Pennsylvania, have invented certain new and useful Improvements in Glass-Furnaces, of which the following is a specification, reference being had therein to the accompanying drawings.

This invention relates to improvements in the manufacture of glass, that is, in the method of treating the materials which are to be fused, the purpose being to provide a more or less nearly continuous stream of the fused glass and the latter to be of a superior quality.

The process herein presents improvements both in respect to the "melting-pot" system and the "tank-furnace" system.

It is probably unnecessary to set forth at length the disadvantages which are incident to each of the above systems, they being well known. Attention will, however, be briefly called to some of them below after I have described my improved process and some of the mechanisms by which it can be carried out.

Figure 1 is a vertical section of a glass-melting furnace embodying my invention, the lower part of said figure being a conventional side view of the fireplace portion of the mechanism. Fig. 2 is a horizontal section. Fig. 3 shows a modified form of furnace, it being a longitudinal section on the line $x\ x$ of Figs. 4 and 5. Fig. 4 is a section on the line $y\ y$, Fig. 3. Fig. 5 is a view, partly in end elevation and partly in section, on the line $z\ z$, Fig. 3. Fig. 6 is a vertical section on the line $x'\ x'$, Fig. 3. Fig. 7 is a vertical longitudinal section of another form, taken on the line $y'\ y'$ of Figs. 8 and 9. Fig. 8 is a horizontal section on the line $z'\ z'$, Fig. 7. Fig. 9 is a top plan view of the furnace in Figs. 7 and 8. Fig. 10 is a vertical section on the line $x^2\ x^2$, Fig. 7. Fig. 11 is a section on the line $y^2\ y^2$, Fig. 7. Fig. 12 is a section of the collector shown in Fig. 7, it being detached and enlarged.

I will first describe the form of apparatus shown in Figs. 1 and 2. The furnace there illustrated may, as concerns many of the parts, such as the fireplaces at E, the benches at F, the eye, the stack H I, and the dome D, be of the ordinary form.

A A indicate collectors. These may be more or less similar in form and structure to the ordinary pots, although as I employ them they do not perform entirely the same function. As shown in Figs. 1 and 2, they are situated in the melting-chamber in the ordinary manner and have working-holes at $a'$.

$a\ a$ indicate bridges or cross bars or plates, made of suitable refractory material, placed across the interior chamber of the collectors and situated so as to intersect the surface of the molten material, the bottom edges being at some distance above the floors. They operate in a way to be described below.

B B' indicate ducts, passage-ways, or flues, each communicating with one of the collectors A. They are formed of fire-clay or other suitable material and are situated so as to traverse more or less of the heating-chamber or passage-way through which rise the products of combustion. They are inclined to the horizon, so that the material shall not pass too suddenly through them, and in the construction now being described, Figs. 1 and 2, each has a part extending on one line toward the center of the furnace, and then a part extending on another line outward from said center to one of the collectors A. These ducts are radically different from those which have been heretofore used in tank-furnaces for melting glass in that they are tightly closed to prevent the entrance of gases or products of combustion to the materials therein, both while the materials are yet in the solid form and after they have become fused to the condition of glass.

The materials to be fused necessarily pass over a prolonged path which insures that they shall be highly heated and melted before reaching the collectors. In order to further increase the melting action before the materials reach the collector, I prefer to break up the continuity of the passage through the ducts by means of steps, corrugations, indentations, or the like, as shown at $b\ b$. These arrest the solid materials in their descent at one or more stages successively and hold them back, so that they can be subjected for a sufficiently long period of time to the heat derived from the products of combustion. The ducts are relatively small in cross dimensions, and this, together with their considerable length, compensates for the loss arising from not having the products of combustion play directly upon the fusing materials.

C indicates a hopper or initial receptacle for the materials which are to be introduced to the duct and fused. As shown in Figs. 1 and 2, it is secured to the stack near the upper end of the ducts B B'. The openings or entrances to the ducts are provided with perforated plates c and with feed-regulators of any suitable sort, such as simple slides c' or valves, and by means thereof any one of the ducts and its collectors may be thrown into or out of use.

The materials to be fused can be introduced to the ducts more or less nearly continuously by an attendant properly manipulating the slides or valves at c', governing the passages of c, or there may be combined with the reservoir an automatic mechanism for agitating the materials and advancing them to the ducts.

The manner of operating the above-described devices will be readily understood. As the materials pass down the flue from the receptacle C they are gradually heated more and more highly. The products of combustion completely envelop them without coming into contact with them, and they are soon reduced to a molten state. On escaping from the ducts they enter the collectors A. I prefer to arrange the latter so that they shall also be kept at a very high heat. Hence if, perchance, any of the materials should escape from the flues without being sufficiently melted they will be fused in the rear part of the collector. The glass is preferably delivered as near the rear walls of the collectors as is practicable to insure complete fusion before it reaches the part to which the workmen have access. The bridges a operate to prevent any imperfectly-melted materials from approaching the working holes, and they also act to effectually separate any scoria or other impurities that may be present in the mass. The amount of fused glass in the collector is under the control of the workmen, who can at any time stop the supply of materials from the reservoir C, but the preferable plan to follow is to so adjust the supply that the glass produced shall merely compensate that which is being withdrawn for working. Thus it will be seen that a constant delivery of material more or less heated may be effected to the rear part of each collector, and at the same time there can be a constant withdrawal of perfectly molten glass from the forward part.

The advantages incident to following this process and using devices having the features of those herein in comparison with the processes and mechanisms heretofore employed will be readily seen. For instance, a constant temperature can be maintained in the furnace, in the ducts, and in each of the collectors, and thus I avoid the disadvantageous and expensive accidents constantly happening when the intermitting method is followed in using either the separate movable pots or in using the larger hearths. The collectors can be much smaller than the melting-pots commonly used, as in my case the melting is largely, if not entirely, effected in the ducts, and the vessel A acts merely to receive the molten material and temporarily retain it, and, as said above, the supply and withdrawal can be readily adjusted to accord with the capacity of each collector.

I am aware of the fact that glass has been produced by passing its constituent materials along ducts more or less inclined and melting them therein, the heat being applied by directing across or upon them and bringing into contact with them the flame or products of combustion from the combustion-chamber, and I do not claim such devices or such a method of operation as of my invention; but in my case, while I retain all of the advantages incident to such a method and to such mechanism, I secure still others which are well marked, as I so arrange the parts and so apply the heat that the products of combustion do not come into contact with the glass or its constituent materials. The ducts B B' are of such construction that all of the heat from the combustion-chamber can be made available, and at the same time they prevent direct contact from any of the products of combustion. I produce glass of a very superior quality, as its texture and constitution are in no way affected by the flame or gases, whereas, as is well known, the continuous processes comprising passage of the glass through open flues have in all cases produced inferior stock.

One of the important features of my invention will be readily understood when the following facts are remembered: It is found in practice that it requires a much higher heat to initially fuse the constituent materials than it does to maintain the glass in the desired molten state after it has been once fused. A heat of from 2,000° to 3,000° Fahrenheit is required for the former, while a degree neighboring upon 1,000° Fahrenheit is sufficient for the latter purpose. In working with the ordinary pots the batch of solid materials is introduced and at first an exceedingly high temperature must be applied to accomplish the fusing, and subsequently this is lowered (that is, after the fusion has been accomplished) and maintained at a lower point until the molten glass has all been worked out, after which another batch is introduced. Thus there are a number of variations in temperature required at different stages in the operation. These not only increase the difficulty and expense in carrying on the manufacture in that way, but, as above said, render the pots constantly liable to impairing and fracture. I apply an intensely-high heat to the solid materials for fusing them and can at the same time and from the same source of heat supply to the collector which holds the molten glass a heat of a much lower degree, and by the devices herein shown and described can accurately adjust or regulate the degrees of temperature of the two parts. The ducts through which the materials pass while melting are directly over the fire-chamber and are impinged upon by the products of combustion while in their most highly-heated state. At the same time more or less of these products of combustion can be caused to pass around the collector or around that part of it from which the glass is withdrawn for working. The flues can be so arranged and dampers or valves so applied as that more or less of the products of combustion shall encompass the fusing-duct and pass directly out or so that as much thereof as is desired can be made to encompass or circulate around the collecting pot or vessel.

When a construction and arrangement of parts such as that shown in Figs. 3 to 6 or in Figs. 7 to 11 is used, I prefer to have the larger proportion of these products play against and around the duct proper and against that side of the collector which first receives the molten material from the duct, in order to insure a perfect fusion, and then take but a minor part of the products of combustion around the opposite side of the collector; but in any event the purpose is to apply and maintain the highest heat around the parts wherein the fusion is occurring and the lowest around the parts where the perfectly-fused metal is held. This obviates entirely the necessity of varying the temperatures either by lowering the fires or by applying cooling air-blasts, as is done in manufacturing glass by any of the modes in which large batches are periodically and suddenly delivered to a pot or chamber, where they are held both before, during, and after fusion.

I am aware of the fact that heretofore use has been made or proposed of a furnace having an inclined passage-way to receive more or less of the solid materials, and down which passage-way they moved while being fused, in connection with a perpendicular tube or duct for also supplying a part of the materials, but in the mechanism referred to the parts were so arranged that all of the products of combustion first passed through the chamber or receptacle for the molten glass and afterward passed to the said inclined passage-way, and in addition to this all of the products of combustion had direct access into both the said glass-receptacle and the said passage and played directly upon the glass. Such a construction is illustrated in the patent to Goodhue, No. 77,479, dated May 5, 1868; but my process and my devices differ radically in both these respects from those last referred to, in that I maintain permanently a perfect exclusion of all the products of combustion from both the glass-receptacle and the fusing chamber or passage, and at the same time am enabled to carry on the fusing and the working of the glass continuously and apply the most intense heat to the part wherein the fusing is to take place and a lesser heat to the parts wherein the glass is maintained in a molten state.

To efficiently regulate the application of the heat to the various parts, use may be made of devices such as those in Figs. 3 to 6 or those in Figs. 7 to 11. In the former construction the heated currents from the combustion-chamber E pass toward the collector, and then some turn to the right and left and pass up through flues N N to the chamber E' above duct B, and others go under the collector and rise up through flues N' N' to flue $N^2$. The former currents that rise in chamber E escape at chimney or flue O, whose passage-way is graduated by a damper or valve at $o$. The other currents escape from flue $N^2$ to the open air and are graduated by a damper or valve $n$.

The valve $n$ can be entirely closed and throw all the heat against and around the fusing-duct, as, for instance, at the starting of the furnace. After the fusing has been started the valve $n$ can be opened partially or entirely, and, if necessary, that at $o$ can be partially closed.

If gas is used as a fuel in the fire-chamber and it is desired to introduce air to insure combustion, or if for any other reason it is desirable to provide for the introduction of air to the furnace, as, for instance, to lower the temperature of the interior parts, flues can be used such as those at M M, having doors $m\ m$ to regulate the entrance of air and communicating with the upper or any desired part of the heating-chambers, and, if necessary, branch flues or ducts, as at $m'$, directed toward the fusing-duct, as in Fig. 5.

In Figs. 7 to 11 the furnace has substantially similar means for graduating and regulating the heated currents. A furnace like that in Figs. 1 and 2 can also have flues and regulators, if desired. As shown, however, this form illustrates the fact that all of the features of the invention are not necessarily dependent on such regulation. The heated currents from the fire-chamber first impinge upon and envelop the fusing-ducts, and then they pass through apertures at G G around the edge of the dome, and finally enter through the apertures G' above the dome into the chamber traversed by the other parts of the fusing-ducts. Such reëntering is caused by the powerful updraft in the upper chamber and through the stack or chimney at the top.

I am also aware that it has been proposed to fuse glass by holding a batch of frit in a vertical tube which contains or forms the two electrodes of a dynamo-electric circuit, the heat being obtained from the current, the object of such a mechanism being to fuse small portions of the material, each being about sufficient for a single article, and I do not wish to be understood as including such processes within the scope of the claims herein; but the important differences between them and that herein will be readily understood by those acquainted with the glass-melting art.

To manufacture glass successfully, it must be fused and manipulated in large masses, and this requires the production of a large amount of heat and the distribution of it over a relatively extensive area. The electric current can be converted into an intense heat, but only at virtually one point, and therefore cannot be practically used in the way that I use the large masses of heated air and gaseous products, which can be produced in one fire-chamber and then distributed over a long duct or chamber for fusing and around the collector containing the molten glass.

One of the essential matters that must be attained in this work is the "plaining" of the glass, that is, allowing the bubbles and all foreign materials to rise to the surface. This requires an appreciable time after the state of fusion has been reached, and with devices such as those herein I provide for this, as the plaining takes place while the fused material is traversing the lower part of the duct, which for good work must be comparatively long to allow for that action. This among other things cannot be attained in the electric furnaces with which I have acquaintance, as the heat is concentrated on a limited area, and is applicable only for the fusion of a small mass at any one time.

Figs. 3 to 6, inclusive, show a modified form of the apparatus adapted to carry out my improvements. In this case there is but a single duct B, and it is substantially straight and continuous, the furnace being of the form shown and the parts being arranged to have the materials pass from one side downward and across to the collector A on the other side. Here, too, the products of combustion rise under and pass around the sides and over the top of the flue, completely enveloping it, and at the same time are prevented from having direct access to the materials that are being used. In other respects the mechanism is in detail more or less similar to that above provided for, that is to say, in respect to the collector, the feed-hopper, the cut-off or feed-regulator, &c.

In Figs. 7 to 12 another modification of the mechanism is shown. In this case the duct is constructed in sections by placing together properly-constructed plates or tiles of refractory material of suitable size, the bottom of one section slightly overlapping the next. The ducts are, however, tightly closed both on the sides and the top, so that the products of combustion have no access to the materials as they pass downward toward the collector.

The lines of travel of the air and of the products of combustion, respectively, through the flues at M M and from the combustion-chamber through the flues N N E' O and the flues N' N² will be readily understood. The products of combustion pass from the fire-chamber E upward, the main part of them impinging on and passing around the melting-duct B to the upper part E' of the fire-chamber and thence to the escape-passage at O. Some of these products are carried up near the collector A, passing from the fire-chamber E through the flues N and thence to the aforesaid upper part E'. Air can be permitted to enter through the flues at M M or through those at N² N'.

What I claim is—

1. The herein-described method for treating materials in the manufacture of glass, which consists in passing them in a stream through a heated duct surrounded by a gas-chamber, passing heated currents of gas or the gaseous products of combustion through said chamber around said duct and therewith melting said materials while passing through the duct, and excluding said gases and products of combustion from said materials while melting them, receiving the molten material in a collector closed against the entrance of the products of combustion, heating the said collector to maintain the material in a fluid state while so isolated, and withdrawing it therefrom for working, substantially as set forth.

2. The herein-described method for treating materials when melting them in the manufacture of glass, which consists in passing them in a stream through a duct situated in the inclosed exhaust-passage of a combustion-chamber directing currents of heated gases or products of combustion against and around said duct from which duct the gases and products of combustion are excluded, arresting said materials at one or more stages in said duct while so passing, and receiving the molten material from said duct in a heated collector closed against the entrance of the products of combustion, substantially as set forth.

3. The herein-described method of fusing materials and treating them after fusion in the manufacture of glass, the same consisting in passing the said materials through a heated duct which is surrounded by inclosed currents of heated gases or products of combustion, then delivering the fused glass to a heated collector closed against the entrance of the products of combustion, and continuously withdrawing it therefrom, for working, substantially as set forth.

4. The herein-described method of fusing materials and treating them after fusion in the manufacture of glass, the same consisting in passing the said materials through a fusing-duct to a collector which receives the molten glass, producing by combustion in a fire-chamber a mass of heated air and gases dividing the said mass into a larger part and an independent smaller part, and simultaneously directing the larger part against and around the melting-duct, and the smaller part against and around said collector, whereby a higher heat is imparted to said duct than to said collector, and excluding the said heated gases and products of combustion from said duct and collector, substantially as set forth.

5. The herein-described method of fusing materials and treating them after fusion in the manufacture of glass, the same consisting in passing said materials along a fusing-duct heated by currents of gas or products of combustion inclosed in a chamber around said duct but excluded therefrom, said duct being inclined whereby the glass can more or less clear itself while therein, receiving said glass in a heated collector or chamber also closed against the entrance of the products of combustion and where it is allowed to stand till entirely cleared and withdrawing it from another heated chamber communicating with that aforesaid at points below the surface, substantially as set forth.

6. In a glass-melting mechanism, the combination of the closed heated collector having a working hole for withdrawing glass, a closed melting chamber or duct communicating with the collector, the heating-chamber inclosing said collector and duct, the reservoir as at C, means for regulating the passage of material from the reservoir to the collector, and a partition or wall $a$ providing a passage-way for the melted material below the surface of the molten glass in the withdrawing-chamber, substantially as set forth.

7. In a glass-melting mechanism, the combination with the closed heated collector of the closed melting-duct, which is inclined to permit the material to pass through it by gravity and which is provided with steps or arresting devices, and the heating-chamber inclosing said duct and collector, substantially as set forth.

8. In a glass-melting mechanism the combination with the fusing-duct, and the collector connected with the fusing-duct, of the fire-chamber, the passage-way for the products of combustion around the collector through which they can pass and from which they can escape, and the passage-way for the products of combustion around the melting-duct through which they can pass and from which they can escape independently of the aforesaid passage-way, substantially as set forth.

9. The combination with the fusing-duct, and the collector connected with the fusing-duct, of the fire-chamber, two exhaust-flues for the final escape from the furnace of the products of combustion, one of the said escape-flues being adjacent to the collector, the two passage-ways through which can pass independently two bodies of heated gas, one around the collector and one around the fusing-duct, said passage-ways connecting with said exhaust-flues, and means for regulating or graduating the flow of said bodies of gas through said passages, substantially as set forth.

10. The combination with the fusing-duct B, and the collector A connected with the fusing-duct, of the fire-chamber, the flues N N leading from the fire-chamber, and the flue or chamber E' leading from flues N, through which the heated gases can rise and pass above the fusing-duct, the flues N', N', leading from the fire-chamber in front of those at N, and adjacent to the collector, and escape flues or passages severally communicating with chamber E' and flues N', substantially as set forth.

11. The combination with the fire-chamber, of the inclined fusing-duct arranged directly above the fire-chamber, the collector at the inner end of the fire-chamber communicating with the fusing-duct and having its rear or receiving part exposed to the heated gases, the chamber or flue E', directly above the fusing-duct, the ducts N, leading from the fire-chamber to said chamber E', the exhaust-flue therefor, the flues N', around the discharging parts of the collector and communicating with the fire-chamber, and the exhaust-flue therefor separate from the exhaust-flue from chamber E', substantially as set forth.

In testimony whereof I affix my signature in presence of two witnesses.

SIMEON BISSELL.

Witnesses:
 BYRON W. KING,
 E. M. WOOD.